United States Patent
Narita (10) Patent No.: US 10,855,918 B2
(45) Date of Patent: Dec. 1, 2020

(54) IMAGE PROCESSING DEVICE, IMAGE PROCESSING METHOD, IMAGE PICKUP APPARATUS, AND PROGRAM STORAGE MEDIUM THAT CALCULATES A MATCHING DEGREE BETWEEN AN ESTIMATED TARGET OF INTEREST AND TRACKED FEATURE POINTS, THEN SELECTS A FEATURE POINT TO WHICH TRACKING IS CONTINUED ACCORDING TO THE MATCHING DEGREE

(71) Applicant: CANON KABUSHIKI KAISHA, Tokyo (JP)

(72) Inventor: Yu Narita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 16/395,634

(22) Filed: Apr. 26, 2019

(65) Prior Publication Data

US 2019/0349520 A1 Nov. 14, 2019

(30) Foreign Application Priority Data

May 9, 2018 (JP) .................................. 2018-090542

(51) Int. Cl.
*H04N 5/225* (2006.01)
*H04N 5/232* (2006.01)
*G06T 7/70* (2017.01)

(52) U.S. Cl.
CPC ........... *H04N 5/23229* (2013.01); *G06T 7/70* (2017.01)

(58) Field of Classification Search
CPC ................................................. H04N 5/23229
See application file for complete search history.

(56) References Cited

U.S. PATENT DOCUMENTS

| | | | | |
|---|---|---|---|---|
| 7,613,321 | B2 * | 11/2009 | Altherr | G06T 7/246 |
| | | | | 382/103 |
| 9,465,433 | B2 * | 10/2016 | Shigeta | G06F 3/01 |
| 2007/0133840 | A1 * | 6/2007 | Cilia | G06K 9/00369 |
| | | | | 382/103 |
| 2019/0182420 | A1 * | 6/2019 | Yasutomi | H04N 5/232125 |
| 2019/0306417 | A1 * | 10/2019 | Yaguchi | G01S 3/7865 |
| 2019/0325608 | A1 * | 10/2019 | Taya | G06T 7/80 |

FOREIGN PATENT DOCUMENTS

JP 2007-334625 A 12/2007

* cited by examiner

*Primary Examiner* — Gary C Vieaux
(74) *Attorney, Agent, or Firm* — Cowan, Liebowitz & Latman, P.C.

(57) ABSTRACT

An image processing apparatus to perform tracking control of feature points estimated to a target of interest of a user. An image processing apparatus of the present invention acquires an image, extracts feature points of the image, tracks the feature points, estimates a target of interest in the image, calculates a matching degree indicating a degree of matching between the estimated target of interest and a distribution of the tracked feature points, and selects a feature point for which tracking will continue from the feature points according to the matching degree.

23 Claims, 9 Drawing Sheets

STATE OF FEATURE POINT EXTRACTION
FOR EACH IMAGE REGION

FIG. 3A

STATE OF IMAGE REGION DIVISION

IMAGE PROCESSING DEVICE, IMAGE PROCESSING METHOD, IMAGE PICKUP APPARATUS, AND PROGRAM STORAGE MEDIUM THAT CALCULATES A MATCHING DEGREE BETWEEN AN ESTIMATED TARGET OF INTEREST AND TRACKED FEATURE POINTS, THEN SELECTS A FEATURE POINT TO WHICH TRACKING IS CONTINUED ACCORDING TO THE MATCHING DEGREE

BACKGROUND OF THE INVENTION

Field of the Invention

The present invention relates to an image processing technology for tracking feature points among a plurality of frame images.

Description of the Related Art

An image pickup apparatus having a function of correcting image blurring caused by camera shake or the like detects a change in position and orientation of the image pickup apparatus caused by hand shake or the like of a user, and suppresses image blurring of a subject image. Examples of self-estimation for detecting the position and orientation of the image pickup apparatus include a technology for structure from motion (SFM) and a technology for position and orientation estimation (visual and inertial sensor fusion) using an inertial sensor. A method of estimating a three-dimensional position of an object present in a real space and a position and orientation of an image pickup apparatus by applying such a technology is known. The same feature point is tracked in a plurality of images with different viewpoints, and three-dimensional coordinates of the feature point are calculated using a principle of triangulation, such that the three-dimensional position of the object and the position and orientation of the image pickup apparatus can be estimated. A process of tracking feature points can be realized by sequentially detecting motion vectors of feature points extracted from an image over a plurality of consecutive frame images (Japanese Patent Laid-Open No. 2007-334625).

However, in a technology disclosed in Japanese Patent Laid-Open No. 2007-334625, since tracking control is performed so that a distribution of the feature points remains uniform in a screen, feature points suitable for an intention of a user are likely not to be obtained depending on a scene.

SUMMARY OF THE INVENTION

The present invention provides an image processing apparatus capable of realizing tracking control of feature points suitable for a target of interest of a user to be estimated.

An image processing apparatus according to a preferred embodiment of the present invention comprises a memory storing instructions; and a processor executing the instructions causing the image processing apparatus to: acquire an image, extract feature points of the image, track the feature points, estimate a target of interest in the image, calculate a matching degree indicating a degree of matching between the estimated target of interest and a distribution of the tracked feature points, and select a feature point for which tracking will continue from the feature points according to the matching degree.

According to the present invention, it is possible to provide an image processing apparatus capable of realizing tracking control of feature points suitable for a target of interest of a user to be estimated.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

Figure 1:
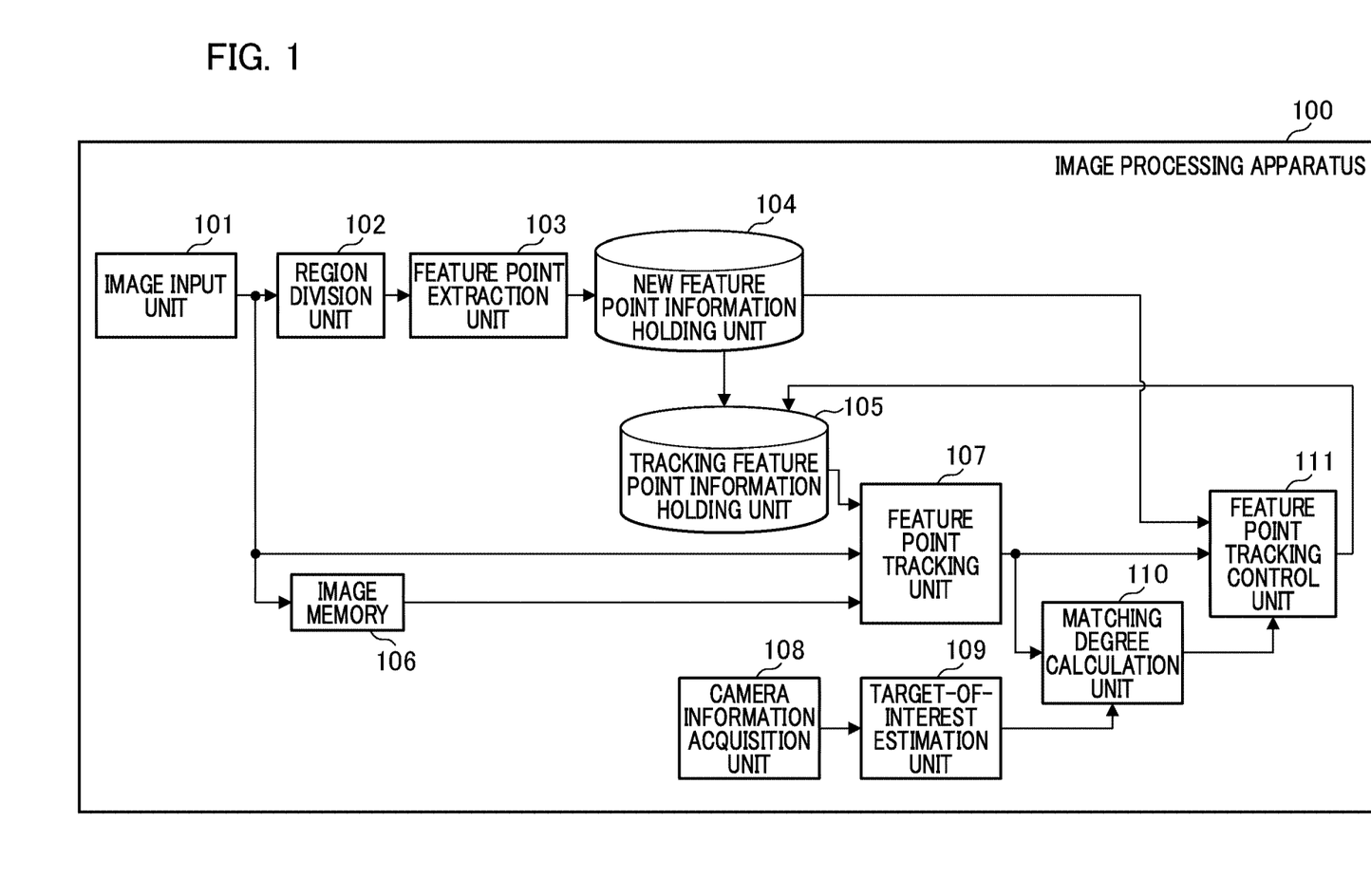
FIG. 1 is a block diagram illustrating a configuration example of an image pickup apparatus according to an embodiment of the present invention.

FIG. 1 is a block diagram illustrating a configuration of an image processing apparatus 100 according to this embodiment.

Image data is input by an image input unit 101. For example, when the present invention is applied to an image pickup apparatus, image data acquired by an image pickup unit including an image pickup optical system and an image pickup element is input to the image input unit 101. Further, image data read from a storage device or a storage medium is input to the image input unit 101. Control for tracking feature points of an image in the image pickup apparatus can be used for a process of correcting image blurring according to camera shake or the like, a process of tracking the same subject over images of a plurality of frames, and the like.

In a process of tracking feature points, a distribution of feature points that are tracking targets may change with a change in a scene. For example, initially, a group of feature points distributed uniformly on a screen may be concentrated on a local region while tracking continues. The reason for this is that a position or size of a subject changes with a change in scene, and therefore positions and a distribution of feature points on the screen change even when the feature points follow the same subject.

As an example of the change in scene, a case in which a user changes an angle of view to a wide-angle side according to a zoom-out operation is assumed. In this case, a feature point located at an edge of the screen before the zoom-out operation is located closer to a center of the screen after the zoom-out operation. As a result, even when feature points uniformly distributed on the screen before the zoom-out operation are determined as tracking targets, feature points in a distribution concentrated on a center of the screen after the zoom-out operation are tracked. A phenomenon in which the distribution of feature points that are tracking targets changes in this manner occurs not only in zooming, but also in a case in which a distance between the image pickup apparatus and the subject changes, a case in which the user changes a composition, or the like.

A desirable distribution of feature points that are tracking targets differs depending on a target of interest in an image intended by the user. For example, when the target of interest of the user is a background, it is desirable for a group of feature points to be uniformly distributed on a screen so that a motion of the entire screen can be evenly detected. On the other hand, when the target of interest of the user is a specific subject (a main subject), it is desirable for a group of feature points to be concentratedly distributed in a main subject region and a periphery thereof so that a motion of the main subject can be emphatically detected. Therefore, when feature points are continuously tracked, it is necessary to control tracking so that a distribution of the groups of feature points changing with a change in scene is always suitable for an intention of the user. Therefore, the embodiment is characterized in that the target of interest in the image intended by the user is estimated from the image or various types of obtained information and tracking feature points are updated at any time on the basis of estimation results, so that tracking suitable for the intention of the user is performed.

Figure 3A:
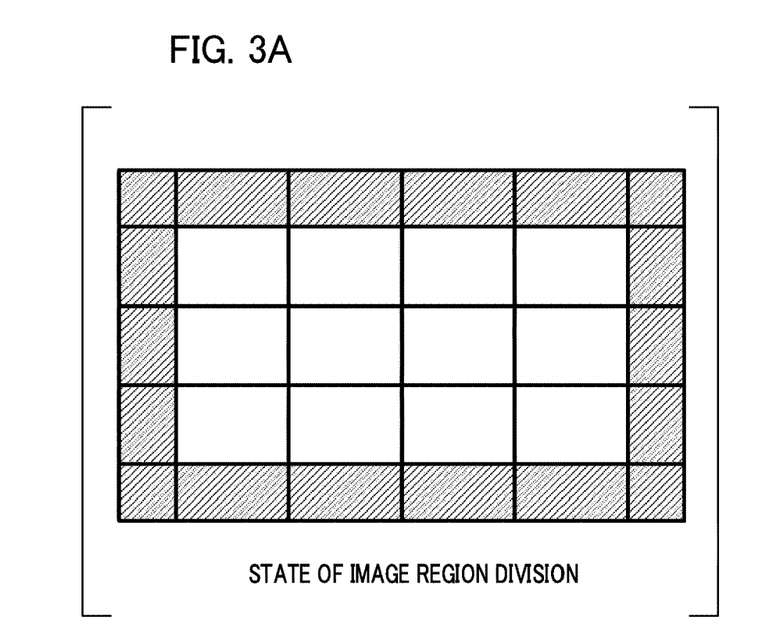
FIGS. 3A and 3B are illustrative diagrams of a process of extracting feature points.

A region division unit 102 divides the image data acquired from the image input unit 101 into a plurality of image regions. The region division unit 102 outputs division information from dividing one image into a plurality of image regions to the feature point extraction unit 103. An example of division of the image region will be described with reference to FIG. 3A. FIG. 3A illustrates an example in which an image is divided into grid-like regions. That is, although the image regions are rectangular in this embodiment, the shapes of the image regions are not limited to such a division and are arbitrary.

The feature point extraction unit 103 extracts a predetermined number of feature points for each image region on the basis of the division information from the region division unit 102. Hereinafter, a feature point extracted for each frame by the feature point extraction unit 103 is referred to as a "new feature point." Further, a feature point that is a track target is referred to as a "tracking feature point." The apparatus of this embodiment includes two information holding units 104 and 105. The first information holding unit 104 holds information on the new feature points extracted by the feature point extraction unit 103. The second information holding unit 105 holds information on the tracking feature points. The tracking feature points are distinguished from the new feature points, but for an initial frame, the new feature points are treated as the tracking feature points.

The image memory 106 acquires image data from the image input unit 101 and temporarily stores data of one frame or a plurality of frames.

A feature point tracking unit 107 acquires input image data from the image input unit 101, image data stored in the image memory 106, and tracking feature point information of the information holding unit 105. The feature point tracking unit 107 detects a motion vector by comparing the image data acquired from the image input unit 101 with the image data acquired from the image memory 106 on the basis of the acquired tracking feature point information, and accordingly tracks the feature points between a plurality of images. The feature point tracking unit 107 outputs information indicating tracking results to a matching degree calculation unit 110 and a feature point tracking control unit 111 to be described below.

The camera information acquisition unit 108 acquires camera information necessary for estimation of a photographing situation. The camera information includes information on the photographing mode, main subject information, a shutter speed, a focal length and depth information of an image pickup optical system, inertial sensor information, user instruction information, and the like.

The target-of-interest estimation unit 109 estimates the target of interest in the image on the basis of the camera information from the camera information acquisition unit 108. An estimation process is performed as to which of the background and the subject is a target of interest of a photographer. When the present invention is implemented, a method of estimating a target of interest in an image is not limited to a specific method.

The matching degree calculation unit 110 calculates a matching degree between the target of interest and the distribution of feature points that are being tracked, on the basis of output of estimation results of the target-of-interest estimation unit 109 and output of tracking results of the feature point tracking unit 107. The feature point tracking control unit (hereinafter referred to as a tracking control unit) 111 acquires new feature point information of the information holding unit 104, the output of the tracking results of the feature point tracking unit 107, and the matching degree calculated by the matching degree calculation unit 110. The tracking control unit 111 determines whether or not tracking is to be continued for each of the feature points that are being tracked, on the basis of the acquired information. Determination results are reflected in the tracking feature point information held in the information holding unit 105.

A process that is performed by the image processing apparatus 100 will be described in detail with reference to FIGS. 2 to 10D.

Figure 2:
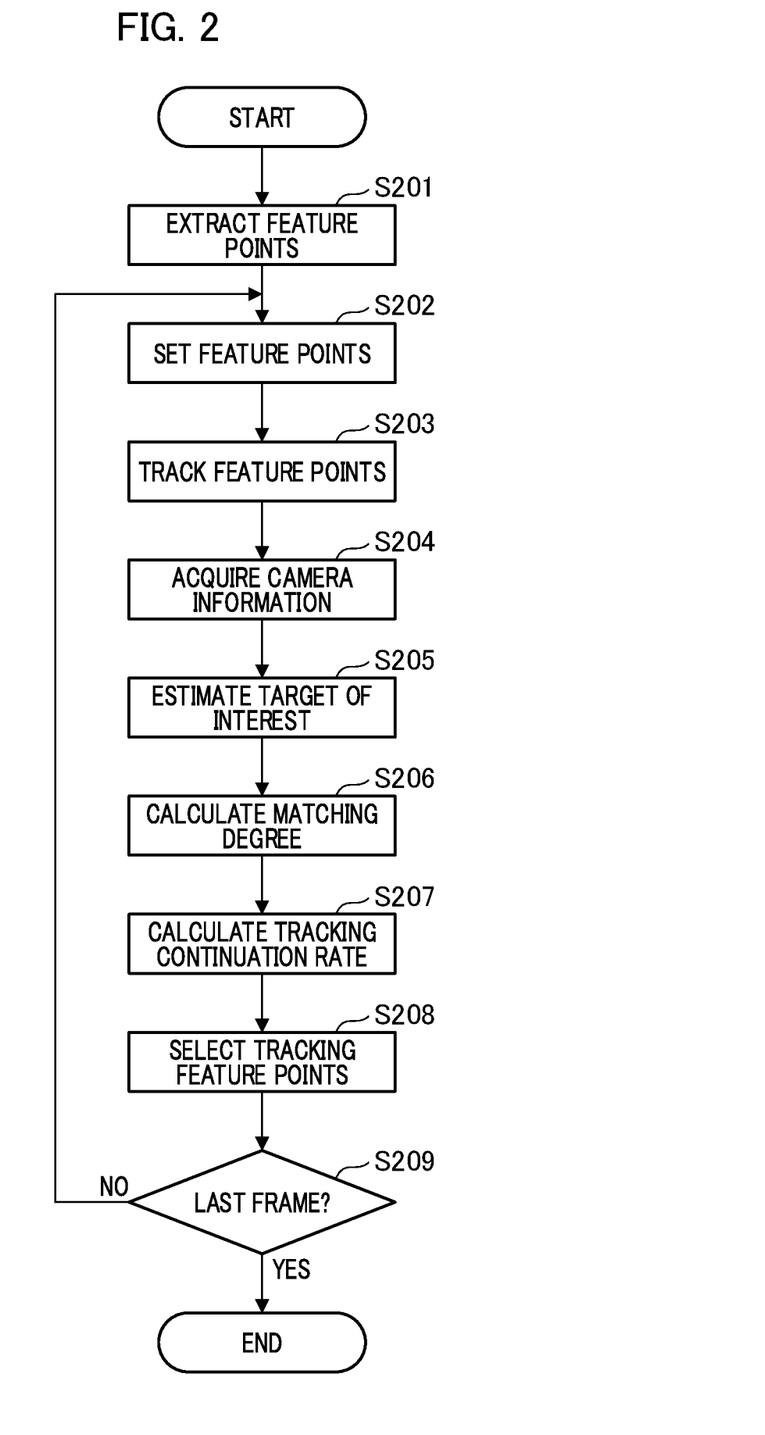
FIG. 2 is a flowchart illustrating image processing according to the embodiment of the present invention.

FIG. 2 is a flowchart illustrating a process of the image processing apparatus 100.

In step S201, the feature point extraction unit 103 extracts a predetermined number of feature points for each piece of image data input from the image input unit 101 and divided by the region division unit 102. Information on the extracted feature points is stored in the information holding unit 104 as new feature point information.

FIG. 3A is a schematic diagram illustrating an example of image region division, and a rectangular region indicated by white is a feature point extraction region. The feature point extraction unit 103 performs extraction of the feature points for the feature point extraction region. Hatched peripheral regions are provided around the feature point extraction region. According to positions of the feature points to be extracted, a template region and a search region to be used for motion vector detection, which will be described below, may deviate from a feature extraction region. Therefore, a peripheral region is prepared as a surplus image region to be associated with the deviating region.

Figure 3B:
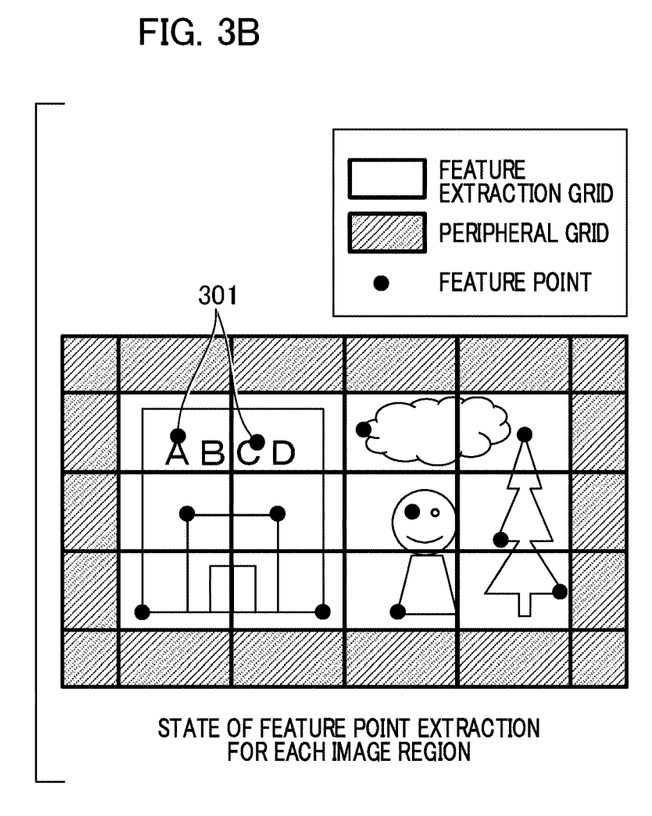

FIG. 3B is a schematic diagram illustrating a method of extracting a feature point for each image region divided into a grid shape. In this example, one feature point 301 is extracted for each image region. As illustrated in FIG. 3B, the feature point extraction region is divided into a plurality of partial regions by a grid. In the embodiment, a rectangular frame that defines a partial region is referred to as a "feature point grid." The feature point 301 in the feature point grid is indicated by a black point. Further, each rectangular frame constituting the peripheral region, that is, each hatched rectangular frame, is referred to as a "peripheral grid."

A method using a Harris corner detector and a Shi and Tomasi method will be described as a method of extracting feature points. Hereinafter, a luminance value at a pixel position (x, y) of an image is denoted as I(x, y), and calculation results of primary differential filter processing in a horizontal direction and a vertical direction with respect to an image are denoted as Ix and Iy, respectively. The feature point extraction unit 103 generates an autocorrelation matrix H shown in Equation (1).

$$H = G * \begin{pmatrix} Ix^2 & IxIy \\ IxIy & Iy^2 \end{pmatrix} \quad (1)$$

In Equation (1), G denotes smoothing according to a Gaussian distribution shown in Equation (2).

$$G(x, y) = \frac{1}{2\pi\sigma^2} \exp\left(-\frac{x^2 + y^2}{2\sigma^2}\right) \quad (2)$$

In the method using a Harris corner detector, a process of extracting pixels having an increasing feature quantity as a feature point is performed through calculation using a feature evaluation equation shown in Equation (3).

$$\text{Harris} = \det(H) - \alpha(tr(H))^2 \quad (\alpha = 0.04 \sim 0.15) \quad (3)$$

In Equation (3), det denotes a determinant and tr denotes a sum of diagonal components, α is a constant, and a value in a range of 0.04 to 0.15 is used experimentally.

Meanwhile, in the Shi and Tomasi method, a feature evaluation equation shown in Equation (4) is used.

$$\text{Shi and Tomasi} = \min(\lambda 1, \lambda 2) \quad (4)$$

λ1 and λ2 in Equation (4) are eigenvalues of the autocorrelation matrix H in Equation (1), and min(λ1, λ2) is a function that selects the smaller of λ1 and λ2. That is, Equation (4) indicates that the smaller eigenvalue between the eigenvalues λ1 and λ2 of the autocorrelation matrix H in Equation (1) is used as a feature quantity. Even when the method of Shi and Tomasi is used, a process of extracting a pixel having an increasing feature quantity as a feature point is performed.

In step S201 of FIG. 2, the feature quantity of the pixel is calculated for each of the divided image regions using Equation (3) or Equation (4), and a process of extracting a predetermined number of pixels from pixels having a larger feature quantity as feature points is executed.

Then, in step S202, the tracking control unit 111 sets the tracking feature point information in the information holding unit 105. Regarding an initial frame, a feature point having new feature point information stored in the information holding unit 104 in step S201 may be set as a tracking target as it is. A method of setting second and subsequent frames will be described below.

In step S203, the feature point tracking unit 107 detects motion vectors with respect to the tracking feature points set in step S202 to track the feature points. Examples of a method of detecting a motion vector include a known correlation method and a block matching method. Any method may be used as a method of calculating a motion vector in the implementation of the present invention. As an example, the block matching method will be described with reference to FIGS. 4A and 4B.

Figure 4A:
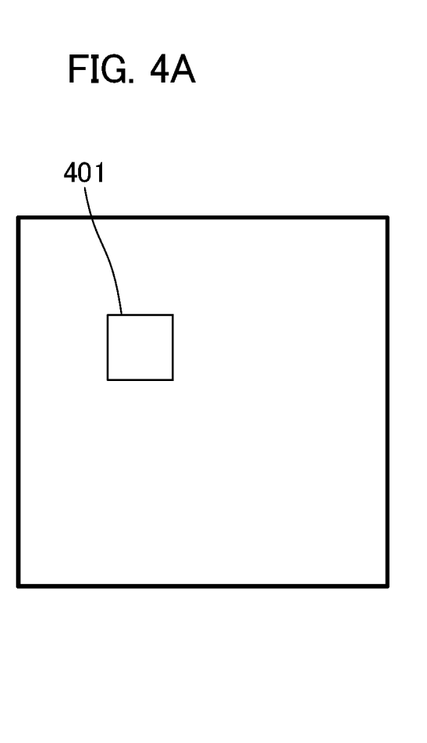
FIGS. 4A and 4B are illustrative diagrams of template matching.
Figure 4B:
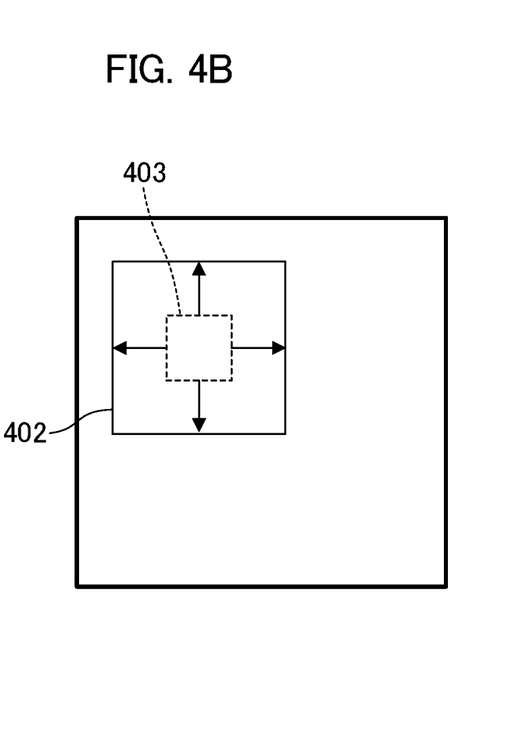

FIGS. 4A and 4B are schematic diagrams illustrating an overview of template matching that is performed using two images. FIG. 4A illustrates a base image among images for motion vector detection, and FIG. 4B illustrates a reference image. For example, data of the base image is a past frame image that is held in the image memory 106, and the data of the reference image is current image data that is directly input from the image input unit 101. Using the image data, it is possible to calculate a motion vector from a past frame image to a current frame image. It should be noted that the base image and the reference image may be interchanged, and in that case, a motion vector from a current frame image to a past frame image is calculated.

A region 401 shown in the base image in FIG. 4A is a template region, and a region 402 shown in the reference image in FIG. 4B is a search region. The feature point tracking unit 107 disposes the template region 401 in the base image, disposes the search region 402 in the reference image, and calculates a correlation value between the template region 401 and the search region 402. Here, the template region 401 is disposed around the feature point extracted in step S201. The search region 402 is disposed with a predetermined size to uniformly include the template region 401 in a vertical direction and a horizontal direction.

In the embodiment, "Sum of Absolute Difference" (hereinafter abbreviated as a SAD) is used as a method of calculating a correlation value. An SAD calculation equation (5) is shown.

$$S\_SAD = \Sigma_i \Sigma_j |f(i,j) - g(i,j)| \quad (5)$$

In Equation (5), f(i, j) represents a luminance value at coordinates (i, j) in the template region 401. Further, g(i, j) represents a luminance value at coordinates (i, j) in a region 403 (hereinafter referred to as a correlation value calculation region) that is a calculation target of a correlation value in the search region 402. In FIG. 4B, the correlation value calculation region 403 is shown as a region within a rectangular frame indicated by a dotted line.

In a method using SAD, an absolute value of a difference between the respective luminance values f(i, j) and g(i, j) in the regions 401 and 403 is calculated. By obtaining a sum of the absolute values of the differences, a correlation value S_SAD is obtained. A smaller value of the correlation value S_SAD indicates that a degree of similarity of texture between the template region 401 and the correlation value calculation region 403 is high. It should be noted that the SAD is an example and a "sum of squared differences" (SSD) or "normalized cross-correlation" (NCC), for example, may be used for calculation of the correlation value.

As illustrated in FIG. 4B, the feature point tracking unit 107 sequentially calculates correlation values while moving the correlation value calculation region 403 over the entire search region 402. Accordingly, a correlation value map is generated for the search region 402. A specific example of the correlation value map is illustrated in FIGS. 5A and 5B.

Figure 5A:
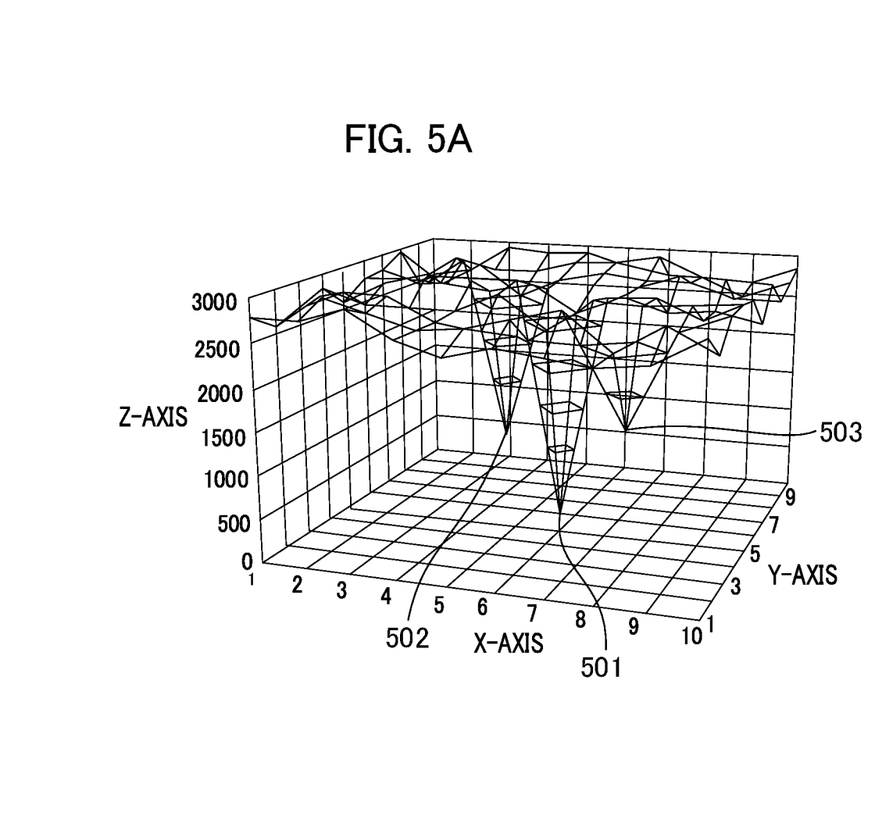
FIGS. 5A and 5B are illustrative diagrams of a correlation value map.
Figure 5B:
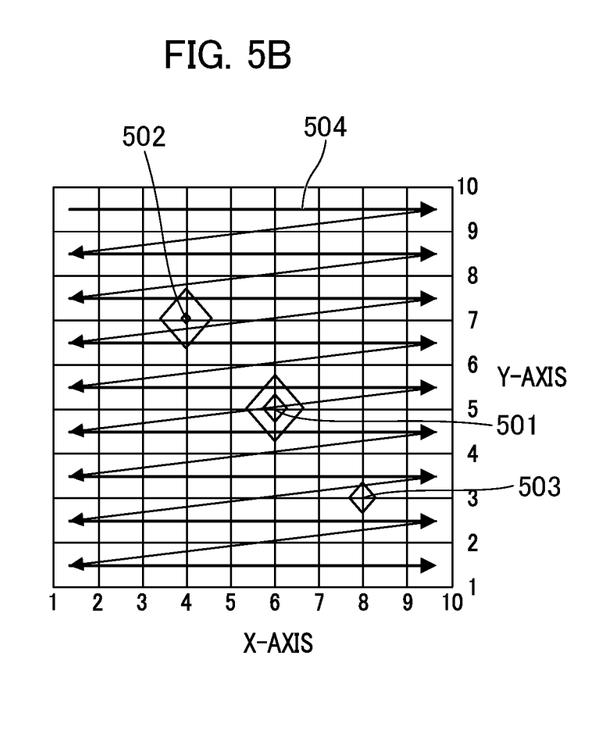

FIGS. 5A and 5B illustrate correlation value maps calculated on the basis of a coordinate system of the search region 402. FIG. 5A illustrates a distribution of correlation values based on a three-axis Cartesian coordinate system, in which an X-axis and a Y-axis indicate correlation value map coordinates, and a Z-axis indicates a magnitude of a correlation value at each coordinate. In this example, a correlation value map having three minimum values 501, 502, and 503 is shown. Further, FIG. 5B illustrates contour lines in FIG. 5A, and illustrates the three minimum values 501, 502, and 503 when viewed from a Z-axis direction. A two-dimensional correlation value map of FIG. 5B can be represented one-dimensionally by arranging the correlation values along a raster as indicated by an arrow 504.

Among the three minimum values 501, 502, and 503 illustrated in FIGS. 5A and 5B, the minimum value 501 is a minimum value in which the correlation value is smallest. It can be determined that texture very similar to the template region 401 is present in a region in which the minimum value 501 has been calculated in the search region 402. A minimum value 502 is a second minimum value, and a minimum value 503 is a third minimum value. This means that there is similar texture subsequent to the minimum value 501.

Thus, the feature point tracking unit 107 calculates a correlation value between the template region 401 and the search region 402, and determines a position of the correlation value calculation region 403 in which the correlation value becomes the smallest. Accordingly, it is possible to specify a movement destination in the reference image corresponding to the template region 401 in the base image. The feature point tracking unit 107 detects a motion vector having a direction and a magnitude corresponding to a direction and an amount of movement toward the movement destination in the reference image with reference to a position of the template region in the base image.

In step S204 of FIG. 2, the camera information acquisition unit 108 acquires camera information necessary for estimation of a photographing situation. In the embodiment, it is assumed that photographing mode information, main subject information, a shutter speed, a focal length and depth information of an image pickup optical system, inertial sensor information, and user instruction information are used as the camera information. The main subject information is, for example, information on person-likeness and a size of a main subject, and a motion of the main subject. For example, when the main subject is the face of a person, the person-likeness and the size of the main subject can be acquired using a known face detection technology in which information on color or contour of the main subject is used. Further, the motion of the main subject can be acquired from a motion vector that is detected through comparison between image frames. The depth information can be detected using a method using a distance measurement sensor, a stereo matching method using a captured image, or the like.

In step S205 of FIG. 2, the target-of-interest estimation unit 109 estimates the photographing situation on the basis of the camera information acquired in step S204, and estimates which of a background and a subject other than the background should be interested among a plurality of subjects when performing feature point tracking. When the target of interest at the time of photographing is the background, it is desirable for the tracking feature points to be uniformly distributed on a screen. The reason for this is that, when the distribution of feature points is locally biased, motion information of the background included in a region in which there is no feature point cannot be obtained. On the other hand, when the target of interest at the time of photographing is a subject other than the background, it is desirable for the tracking feature points to be concentratedly distributed near the subject. The reason for this is that, when the distribution of feature points on the screen is uniform, motion information of the subject that is a target of interest cannot be obtained sufficiently. For these reasons, the target-of-interest estimation unit 109 estimates whether the target of interest is the background or the subject on the basis of the camera information. It is possible to control the distribution of the tracking feature points according to estimation results.

A method of estimating a target of interest based on the camera information will be described in detail. First, a degree of background indicating a level of possibility of the target of interest being the background, and a degree of subject indicating a level of possibility of the target of interest being a subject other than the background are calculated for each piece of camera information. Hereinafter, the degree of background is denoted by D, and the degree of subject is denoted by O. D and O are expressed as numerical values such that a sum of D and O is 1. Although D and O are used in the embodiment, only one of the degree of background and the degree of subject may be calculated.

Examples of the photographing mode are as follows.

(Portrait Mode)

Since photographing is highly likely to be performed with a person being of interest as the main subject, the O value is set to be great (for example, 0.9) and the D value is set to be small (for example, 0.1).

(Landscape Mode)

Since photographing is highly likely to be performed with a landscape being of interest, the O value is set to be small (for example, 0.1) and the D value is set to be great (for example, 0.9).

Thus, the degree of subject and the degree of background are determined by assuming a highly likely photographing situation according to a set photographing mode.

For the person-likeness of the main subject, when the main subject is more person-like, photographing is highly likely to be performed with the subject being of interest. Therefore, the O value is set to be great (for example, 0.7) and the D value is set to be small (for example, 0.3).

For the size of the main subject, when the main subject is larger, photographing is highly likely to be performed with the subject being of interest. Therefore, the O value is set to be large (for example, 0.8) and the D value is set to be small (for example, 0.2).

For the motion of the main subject, when the motion of the main subject is less, it is estimated that the user is holding a camera to capture the subject, and photographing is highly likely to be performed with the subject being of interest. Therefore, the O value is set to be great (for example, 0.6) and the D value is set to be small (for example, 0.4).

Further, when the shutter speed is higher, photographing is highly likely to be performed with a subject moving at high speed being of interest. Therefore, the O value is set to be great (for example, 0.7) and the D value is set to be small (for example, 0.3).

A relationship between the camera information and a subject of interest is illustrated in Table 1 below.

TABLE 1

| | | Target of interest | |
|---|---|---|---|
| Camera information | | Likely background | Likely subject |
| Photographing mode | | Landscape (0.9/0.1) | Portrait (0.1/0.9) |
| Main subject information | Person-likeness | Low (0.7/0.3) | High (0.3/0.7) |
| | Size | Small (0.8/0.2) | Large (0.2/0.8) |
| | Motion | Great (0.6/0.4) | Small (0.4/0.6) |
| Shutter speed | | Slow (0.7/0.3) | Fast (0.3/0.7) |

※Numerical values in parentheses indicate examples of degree of background/degree of subject.

In Table 1, examples of photographing mode information, main subject information, and shutter speed are shown as camera information, and numerical values in parentheses indicate examples of degree of background (D value)/degree of subject (O value).

Next, a focal length and depth information of the image pickup optical system will be described. It is difficult to deduce an intention of the photographer when each of such pieces of information is used alone. Therefore, an example of a method of estimating a target of interest by combining both of the focal length and the depth information will be described.

The focal length is denoted by f millimeter, and the distance from the image pickup apparatus to the main subject, that is depth information, is denoted by d millimeter. When the f value and the d value are known and a size of the main subject on an image pickup surface is denoted by X millimeter, an actual size (Y millimeter) of the main subject is calculated by Equation (6) below.

$$Y = \frac{d}{f} X \qquad (6)$$

When the value of the actual size Y of the main subject is known, an intention of a photographer can be estimated from a relationship with the size X of the main subject on an image plane or the focal length f. For example, when the actual size (a Y value) of the main subject is small but the size (an X value) of the main subject on an image plane is great and the focal length f is great, it is estimated that the photographer has great interest in the main subject. Therefore, when the Y value is smaller, the X value is greater, and the focal length f is greater, the degree of subject O is set to be higher and the degree of background D is set to be lower.

It is difficult for information on an inertial sensor that detects the motion of the image pickup apparatus to deduce an intention of a photographer when the information is used alone. Therefore, an example of a method of estimating a target of interest by combining the inertial sensor information and motion information of the subject will be described. When the target of interest is a subject other than the background, the photographer moves the camera to place the subject at a predetermined position within an angle of view, so that the motion of the subject is relatively smaller than the motion of the image pickup apparatus. Therefore, if the amount of movement of the subject between frame images is smaller than the amount of movement of the camera which is corresponding to the frame images and obtained from the inertial sensor information, it is estimated that the photographer is more likely to hold the camera to capture the subject. In this case, since photographing is highly likely to be performed with the subject being of interest, the degree of subject O is set to be high and the degree of background D is set to be low.

When a plurality of pieces of camera information can be used for estimation of a target of interest, a weighting addition process is performed on the degree of background and the degree of the subject that are obtained for each pieces of camera information, so that a final degree of background and a final degree of the subject are calculated. A value of the weighting coefficient may be set, for example, on the basis of accuracy of each information source. This will be described in detail using Table 1.

The degrees of background obtained from the photographing mode, the person-likeness of the main subject, the size of the main subject, the motion of the main subject, and the shutter speed are respectively denoted as Da, Db, Dc, Dd, and De. The weighting coefficients corresponding to the photographing mode, the person-likeness of the main subject, the size of the main subject, the motion of the main subject, and the shutter speed are respectively denoted as Ga, Gb, Gc, Gd, and Ge. The final degree of background D can be calculated by Equation (7).

$$D = Ga \times Da + Gb \times Db + Gc \times Dc + Gd \times Dd + Ge \times De \qquad (7)$$

For example, the weighting factor values are set to Ga=0.3, Gb=0.2, Gc=0.2, Gd=0.1, and Ge=0.2. Here, each coefficient value is normalized so that Ga+Gb+Gc+Gd+Ge=1. For example, the following conditions are assumed.

The photographing mode is the landscape mode (Da=0.9), the person-likeness of the main subject is high (Db=0.3), the size of the main subject is small (Dc=0.8), the motion of the main subject is small (Dd=0.4) and the shutter speed is slow (De=0.7).

In this case, D=0.6 is calculated from Equation (7). A final degree of subject O value can also be calculated like the D value. It should be noted that, when accuracy of each information source is the same or unknown, all weighting coefficient values may be set to the same value. Further, when the user instruction information is used as the camera information, for example, the user can instruct a degree of interest of the background and the subject to the image pickup apparatus. In this case, the estimation is useless, and the degree of background and the degree of subject can be determined according to the user instruction information.

Then, in step S206 of FIG. 2, the matching degree calculation unit 110 calculates a matching degree. The matching degree is an index indicating a degree at which the positions and distribution of feature points matches the target of interest of the user estimated in step S205. An example of a method of calculating the matching degree will be described in detail with reference to FIGS. 6A to 6D.

FIGS. 6A to 6D are schematic diagrams illustrating an example of an image, and show a subject region 601 and a background region 602 in a rectangular frame. The background region 602 is a region other than the subject region 601 in the entire screen. Triangle symbols with a white inside denote feature points 603 positioned in the subject region 601, and feature points 604 positioned in the background region 602 are denoted by black dots. A region 605 indicated by a dotted line frame in the subject region 601 is a region including the feature points 603, and a region 606 indicated by a broken line frame in the background region 602 is a region including the feature points 604.

Figure 6A:
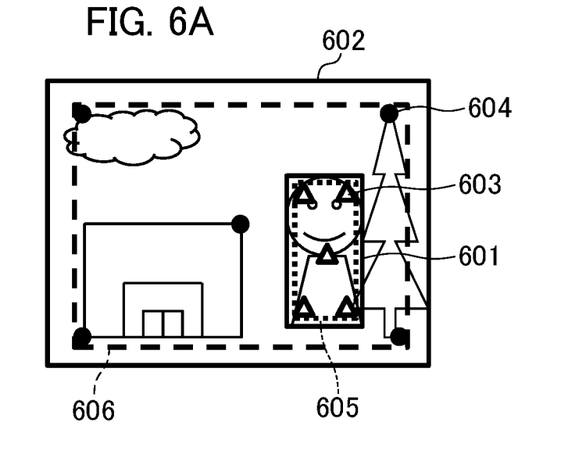
FIGS. 6A to 6D are illustrative diagrams of a process of calculating a matching degree.
Figure 6B:
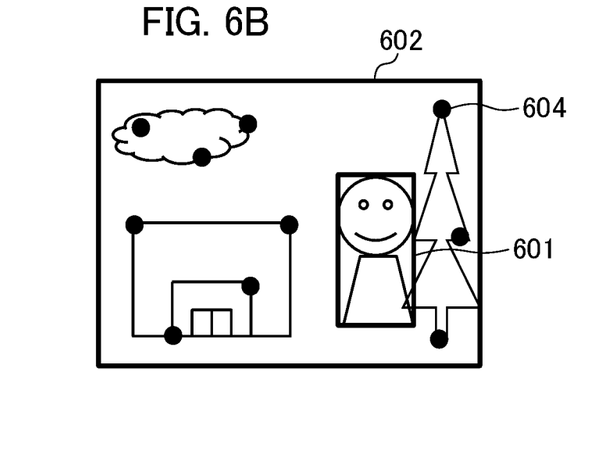

As an example, a case in which a total number of feature points is 10, the degree of background and the degree of subject are equal, and D=O=0.5 will be described. As illustrated in FIG. 6A, when the feature points are five points each in the background region 602 and the subject region 601 and are present at an equal ratio of 1:1, the matching degree between the target of interest of the user and the positions of feature points becomes high. On the other hand, when there are ten feature points in the background region 602 and there is no feature point in the subject region 601 as illustrated in FIG. 6B, the matching degree between the target of interest of the user and the positions of the feature points becomes low. The matching degree (denoted by S) can be calculated using, for example, Equation (8).

$$S = 1 - (a - m)^2 \qquad (8)$$

In Equation (8), "a" denotes the degree of background and "m" denotes a proportion of the feature points 604 positioned in the background region 602.

Here, $(a-m)^2$ is equal to $\{(1-a)-(1-m)\}^2$, "1-a" represents the degree of the subject, and "1-m" represents a proportion of the feature point 603 positioned in the subject region 601. Alternatively, "a" and "m" may be treated as the degree of subject and the proportion of the feature point positioned in the subject region 601.

In the case of FIG. 6A, a=m=0.5. $S=1-(0.5-0.5)^2=1$ is obtained using Equation (8), and the matching degree S is high.

Further, in the case of FIG. 6B, a=0.5 and m=1. $S=1-(0.5-1)^2=0.75$ is obtained using Equation (8), and the matching degree is lower than that in FIG. 6A.

Note that, in the case the target of interest of the user is the background (in the case the degree of background D is equal to 1), the matching degree S is 1 if all of the feature pints are positioned in the background region 602, and the matching degree S is 0 if all of the feature pints are positioned in the subject region 601. Therefore, the matching degree is easy to intuitively understand in the case D=1.

Figure 6C:
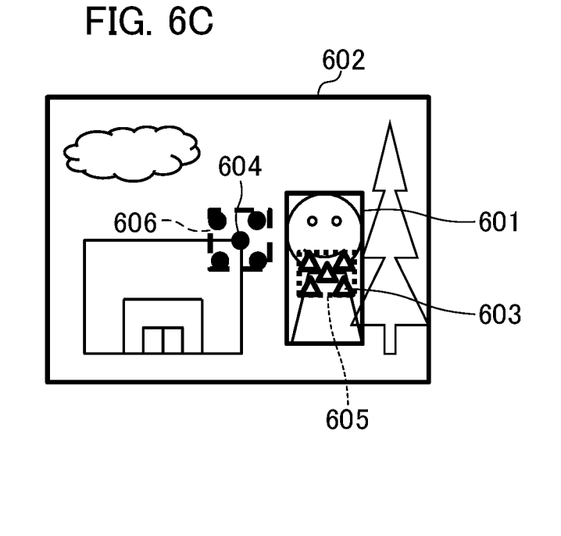
Figure 6D:
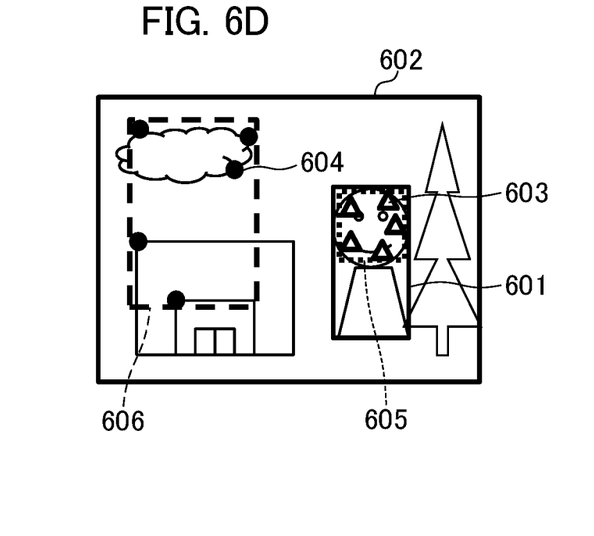

FIG. 6C illustrates a case in which a variation in a feature point distribution is small even when the number of the feature points positioned in the subject region 601 and the number of the feature points positioned in the background region 602 are the same. In FIG. 6C, the feature points 603 are concentratedly distributed in the limited region 605 in the subject region 601, and the feature points 604 are concentratedly distributed in the limited region 606 in the background region 602. Further, FIG. 6D illustrates a case in which a deviation between the distribution of the feature points 603 and 604 is large in the subject region 601 and the background region 602. In the case of FIGS. 6C and 6D, since a motion of the target of interest of the user cannot be accurately ascertained, the matching degree calculation unit 110 determines that the matching degree is low.

The region 605 and the region 606 can be used when the matching degree calculation unit 110 determines a degree of variation in or a degree of deviation of the distribution of the feature point. For example, regarding the degree of variation in the distribution of the feature point, an area of the region 605 becomes small when the variation in the feature point 603 positioned in the subject region 601 is small. Similarly, when the variation in the feature point 604 positioned in the background region 602 is small, an area of the region 606 becomes small. Therefore, when a proportion of an area that the region 605 occupies in the subject region 601 is higher, the matching degree calculation unit 110 determines that the variation in the distribution of the feature point 603 is large and calculates a high matching degree. Similarly, when a proportion of an area that the region 606 occupies in the background region 602 is higher, the matching degree calculation unit 110 determines that the variation in the distribution of the feature point 604 is large and calculates a high matching degree.

Regarding the degree of deviation of the distribution of the feature point, the larger the deviation of the feature point 603 positioned in the subject region 601, the longer a distance between a centroid of the region 605 and a centroid of the subject region 601. Further, the larger the deviation of the feature point 604 positioned in the background region 602, the longer a distance between a centroid of the region 606 and a centroid of the background region 602. Therefore, the matching degree calculation unit 110 determines that the deviation of the distribution of the feature point 603 is small when the centroid of the region 605 is closer to the centroid of the subject region 601, and calculates a high matching degree. Similarly, the matching degree calculation unit 110 determines that the deviation of the distribution of the feature point 604 is small when the centroid of the region 606 is closer to the centroid of the background region 602, and calculates a high matching degree.

In the embodiment, an example in which the areas and the centroids of the regions 605 and 606 are used for a determination as to the degree of variation in or the degree of deviation of the distribution of the feature point is shown, but the present invention is not limited thereto. For example, the matching degree calculation unit 110 may determine the degree of variation in or the degree of deviation of the distribution of the feature point using variance values of the coordinate values of the feature points 603 and 604. In this case, it is determined that the variation is larger and the deviation is smaller when the variance value of the coordinate value of the feature point is greater, and the high matching degree is calculated.

As described above, the matching degree calculation unit 110 calculates the matching degree using one or more of the number of feature points positioned in the background region or the subject region, the degree of variation of the distribution of the feature point, and the degree of deviation of the distribution of the feature point, and calculates the matching degree.

In step S207 of FIG. 2, the tracking control unit 111 calculates a tracking continuation rate on the basis of the matching degree calculated in step S206. The tracking continuation rate indicates a proportion of feature points for which tracking will continue. This will be described in detail with reference to FIG. 7.

Figure 7:
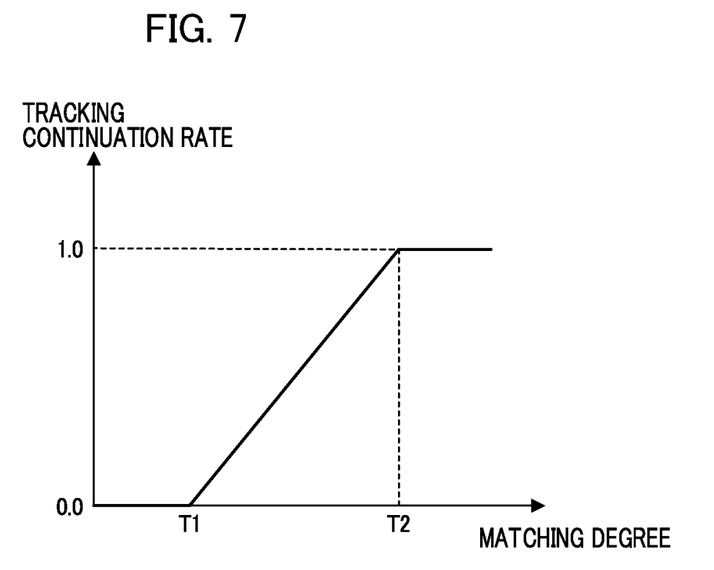
FIG. 7 is a diagram illustrating a relationship between a matching degree and a tracking continuation rate.

FIG. 7 is a graph showing an example of association between the matching degree and the tracking continuation rate. In FIG. 7, a horizontal axis indicates the matching degree S. and a vertical axis indicates the tracking continuation rate (which may have a value of 0.0 to 1.0). A first threshold value T1 and a second threshold value T2 indicated on the horizontal axis have a relationship of T1<T2. Basically, since a higher matching degree means that accuracy of tracking of feature points suitable for an intention of the user is high, a high tracking continuation rate is calculated. In the example of FIG. 7, the threshold values T1 and T2 are set. The tracking continuation rate is zero when the matching degree is equal to or smaller than T1, and the tracking continuation rate is 1.0 when the matching degree is equal to or greater than T2. Further, in the example of FIG. 7, in a section in which the matching degree is between the threshold value T1 and the threshold value T2, the tracking continuation rate linearly increases with an increase in the matching degree. It should be noted that a method of associating the matching degree with the tracking continuation rate in a nonlinear relationship or a method of associating the matching degree with the tracking continuation rate in a stepwise manner may be adopted. Further, the number of tracking feature points for which tracking will continue may be directly calculated instead of the tracking continuation rate which is a proportion of feature points for which tracking will continue.

In step S208 of FIG. 2, the tracking control unit 111 calculates the number of feature points to continue tracking on the basis of the tracking continuation rate calculated in step S207, and selects feature points to continue tracking by the number. In a process of selecting a feature point, the feature points for which tracking will continue are selected using the matching degree, the reliability of tracking, a distance from a centroid of a region that is the target of interest (this centroid corresponds to the target of interest) to the feature point, a statistical value of the motion vector, and the like as indexes.

For example, the matching degree will be described. The tracking control unit 111 randomly selects feature points for which tracking will continue, and calculates the matching degree using the same method as the matching degree calculation unit 110. This process is repeatedly executed for a predetermined number of times, and a combination of feature points having the highest matching degree is selected. It should be noted that, when the tracking control unit 111 randomly selects the feature points, the tracking control unit 111 determines a proportion of the number of feature points to be selected from each of the background region and the main subject region, on the basis of a ratio between the degree of background and the degree of subject described in step S205.

A specific example of reliability of tracking will be described with reference to FIGS. 8A to 8D and FIGS. 9A and 9B. FIGS. 8A to 8D are illustrative diagrams of a correlation value index that is calculated by the feature point tracking unit 107. A horizontal axis indicates a pixel address corresponding to a pixel position, and a vertical axis indicates a correlation value. Graphs of FIGS. 8A, 8B, and 8D each show an example in which the number of minimum values of the correlation value is one, and a graph of FIG. 8C shows an example in which the number of minimum values of the correlation value is plural.

Figure 8A:
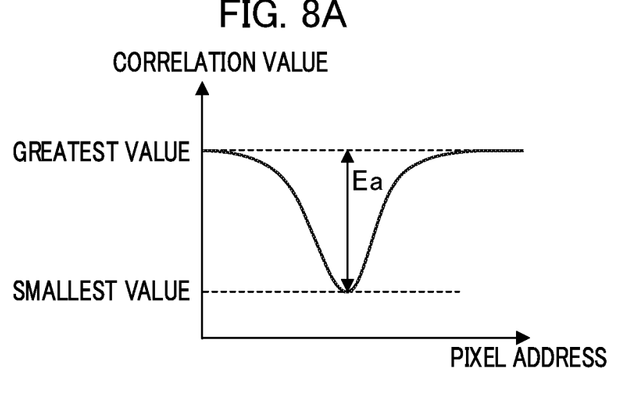
FIGS. 8A to 8D are diagrams illustrating examples of correlation value indexes.
Figure 8B:
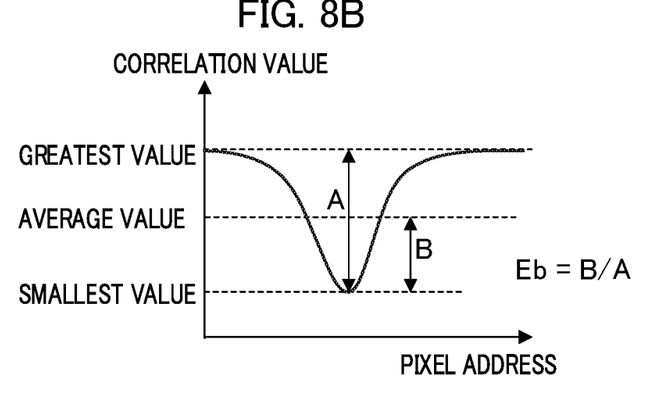
Figure 8C:
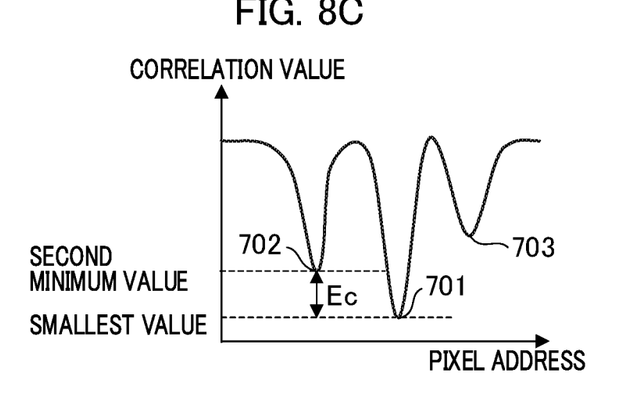
Figure 8D:
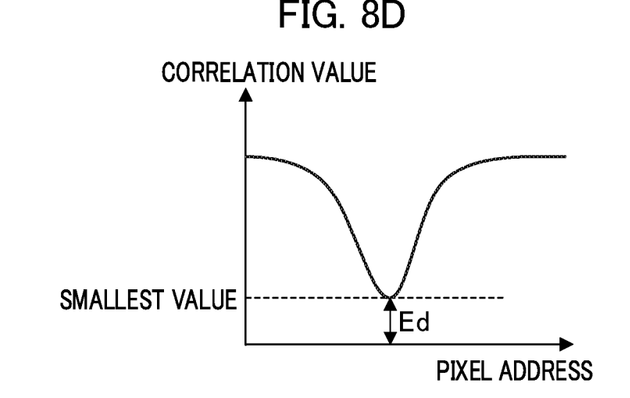

A correlation value index Ea illustrated in FIG. 8A represents a difference between a greatest value and a smallest value of the correlation value. A correlation value index Eb illustrated in FIG. 8B represents a ratio "B/A" obtained by dividing a difference B between an average value and the smallest value of the correlation value by the difference A between the greatest value and the smallest value of the correlation value. In FIG. 8C, in an example in which there are three minimum values 701, 702, and 703, the minimum value 701 is a smallest value and the minimum value 702 is a second smallest minimum value. A correlation value index Ec represents a difference between the minimum value (a smallest value) 701 and the minimum value 702. In FIG. 8D, one minimum value is a smallest value, and a correlation value index Ed is a smallest value.

Figure 9A:
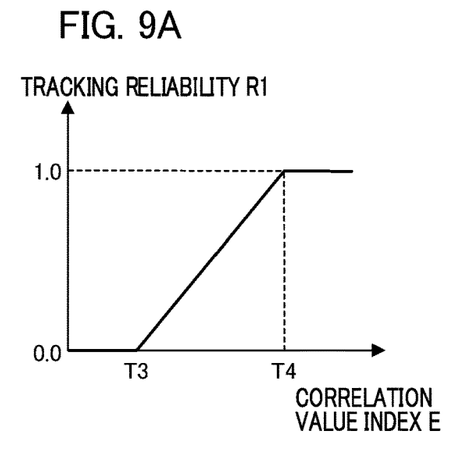
FIGS. 9A and 9B are illustrative diagrams of tracking reliability.
Figure 9B:
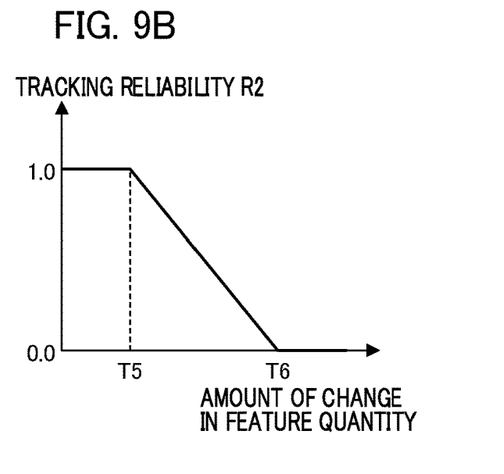

FIGS. 9A and 9B are illustrative diagrams of tracking reliability. FIG. 9A illustrates a relationship between a correlation value index E indicated on a horizontal axis and a tracking reliability R1 indicated on a vertical axis. When the correlation value index E is smaller than a threshold value T3, the tracking reliability R1 is zero, and when the correlation value index E is greater than a threshold value T4 (>T3), the tracking reliability R1 is 1. When the correlation value index E is equal to or greater than the threshold value T3 and equal to or smaller than the threshold value T4, the tracking reliability R1 linearly increases as the correlation value index E increases. Further, FIG. 9B illustrates a relationship between the amount of change in the feature quantity indicated on a horizontal axis and a tracking reliability R2 indicated on a vertical axis. The amount of change in the feature quantity can be obtained by calculating the feature quantity using Equation (3) or Equation (4) before and after the tracking and calculating a difference of the calculated feature quantities. When the amount of change in the feature quantity is smaller than a threshold value T5, the tracking reliability R2 is 1 and when the amount of change in the feature quantity is greater than a threshold value T6 (>T5), the tracking reliability R2 is zero. When the amount of change in the feature quantity is equal to or greater than the threshold value T5 and equal to or smaller than the threshold value T6, the tracking reliability R2 linearly decreases with an increase in the amount of change in the feature quantity. A method of correlating the correlation value index or the amount of change in the feature quantity with the tracking reliability in a nonlinear relationship, or a method of correlating the correlation value index or the amount of change in the feature quantity with the tracking reliability in a stepwise manner rather than continuously may be adopted.

The tracking control unit 111 calculates the reliability of the tracking indicating the accuracy of the tracking using, for example, the feature quantity of the feature point, and selects the feature points in order from the feature point having the higher tracking reliability. When the tracking control unit 111 can correctly track the same feature point, the change in the feature quantity of the feature point becomes small before and after the tracking. Therefore, the tracking control unit 111 calculates a higher reliability of the tracking when the amount of change in the feature quantity before and after the tracking is smaller (see FIG. 9B).

Regarding a distance from a centroid of the region that is the target of interest in the image to the feature point, the tracking control unit 111 calculates a centroid of each of the background region and the main subject region of the image. With respect to the feature points positioned in the background region, the tracking control unit 111 selects the feature points in order of a greater distance from the centroid of the background region in order to ascertain the motion of the entire screen. On the other hand, with respect to the feature points positioned in the main subject region, the tracking control unit 111 selects the feature points in order of a smaller distance from the centroid of the main subject region in order to ascertain a motion around the centroid of the main subject.

The statistical value of the motion vector will be described. The tracking control unit 111 generates a histogram of motion vectors and selects a feature point on the basis of the frequency of each bin. For example, since a motion different from those of other feature points can be detected for a feature point belonging to bin at a lower frequency, the tracking control unit 111 selects more feature points as compared with a bin at a high frequency.

Finally, the plurality of indexes described above are combined and a process of selecting a feature point for which tracking will continue is performed. Hereinafter, a combination method based on weighted addition and a priority will be described. In the combination according to weighted addition, each index is associated with a score representing a priority of selection, and a weighted addition process of a score is performed. An example of associating of each index with the score is illustrated in FIGS. 10A to 10D.

Figure 10A:
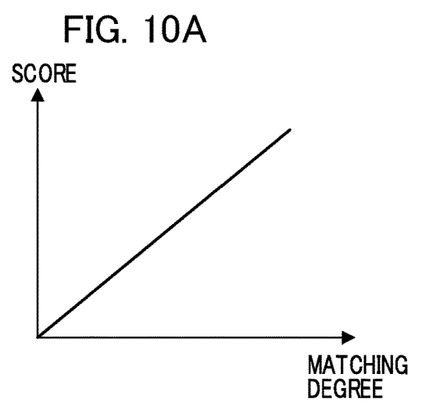
FIGS. 10A to 10D are diagrams illustrating a method of selecting feature points for which tracking will continue.

FIG. 10A is a graph showing association between the matching degree indicated on a horizontal axis and a score indicated on a vertical axis. In order for tracking liable to be continued, the higher the matching degree is, the higher the score is calculated.

Figure 10B:
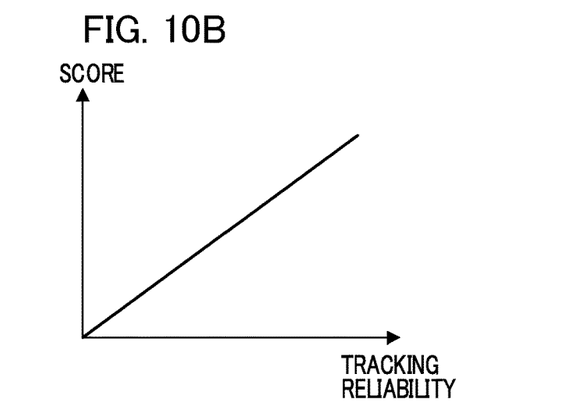

FIG. 10B is a graph showing association between a reliability of tracking indicated on a horizontal axis and a score indicated on a vertical axis. In order for tracking liable to be continued, the higher the reliability of tracking is, the higher the score is calculated.

Figure 10C:
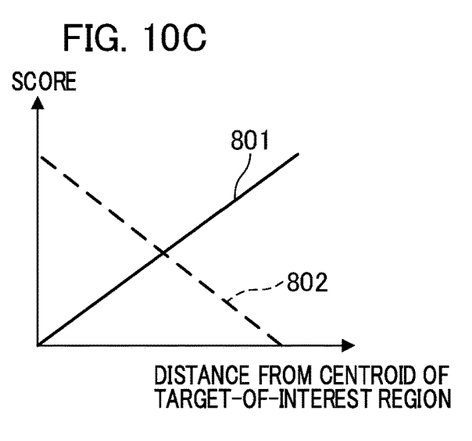

FIG. 10C is a graph showing association between a distance from a centroid of the region that is the target of interest to a feature point, indicated on a horizontal axis, and a score, indicated on a vertical axis. A graph line 801 indicated by a solid line shows association with the feature points positioned in the background region. In order for tracking is liable to be continued, the greater the distance from the centroid of the background region to the feature point, the higher the score is calculated.

On the other hand, a graph line 802 indicated by a broken line shows association with the feature points positioned in the subject region. In order for the tracking is liable to be continued, the smaller the distance from the centroid of the subject region to the feature point, the higher the score is calculated.

Figure 10D:
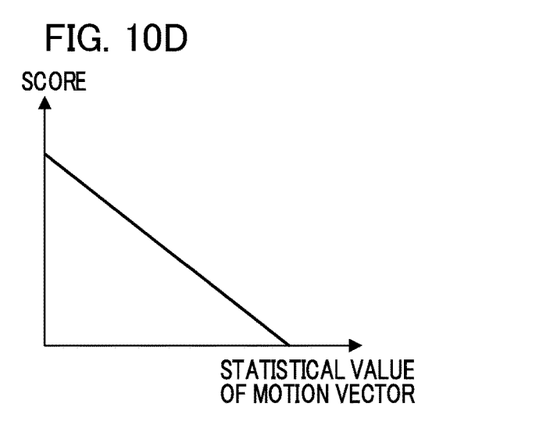

FIG. 10D is a graph showing association between a statistical value of a motion vector (a frequency of affiliated bin in a histogram) indicated on a horizontal axis and a score indicated on a vertical axis. In order for tracking is liable to be continued, the smaller the statistical value of the motion vector, the higher the score is calculated.

Here, scores corresponding to the respective indexes, that is, scores corresponding to the degree of matching, the reliability of tracking, the distance from the centroid of the region that is the target of interest to the feature point, and the statistical value of the motion vector are dented by Ra, Rb, Rc, and Rd. When a final score is denoted as R, R is calculated by weighted addition of Ra. Rb, Rc and Rd. When weighting coefficients of Ra, Rb, Rc, and Rd are denoted as Wa, Wb, Wc. and Wd, respectively, the score R is calculated by Equation (9).

$$R = Wa \times Ra + Wb \times Rb + Wc \times Rc + Wd \times Rd \qquad (9)$$

The weight for each score is set, for example, on the basis of the accuracy of the information source of the score. When the accuracy of each information source is the same or unknown, all the weights may be set to the same value. By selecting the feature points for which tracking will continue in descending order of values of the scores R, it is possible to realize a selection process in which a plurality of indexes are considered.

Next, a combination based on a priority will be described. In this case, the tracking control unit 111 imparts a priority to each index or a score corresponding thereto in advance, and adopts the index or the score having a higher priority as a criterion for selecting more feature points. For example, it is assumed that the priority of the score is Ra>Rb>Rc>Rd. The tracking control unit 111 selects, for example, 40% of the feature points for which tracking will continue, on the basis of Ra, 30% on the basis of Rb, 20% on the basis of Rc, and 10% on the basis of Rd. Assignment of selection of feature points is determined so that a sum of ratios based on the priorities of the scores becomes one.

In step S209 of FIG. 2, the image processing apparatus 100 determines whether or not the process has been completed up to the last frame. When the process has been completed up to the last frame, a series of process is ended. In contrast, when the process has not been completed up to the last frame, the process proceeds to step S202. In this case, the tracking control unit 111 sets information on the feature points selected in step S208 in the information holding unit 105 as feature point information (tracking feature point information) of a tracking target in the next frame. Further, the tracking control unit 111 compensates for new feature points by the number of feature points not selected in step S208 and similarly sets the information in the information holding unit 105. The feature points to be compensated are selected from the group of feature points extracted in step S201. For example, there is a method of selecting the feature points at random, or a method of selecting the feature points using the matching degree described in step S206. It is preferable to select the feature points so that a matching degree calculated using the same method as in the matching degree calculation unit 110 becomes high.

In the embodiment, the distribution of the tracking feature points is controlled so that the distribution matches the target of interest of the user estimated using the camera information, such that a tracking feature point suitable for the target of interest can be acquired. According to the embodiment, it is possible to perform tracking control of feature points suitable for an intention of the user always even when a scene changes when feature points are continuously tracked. In addition, it becomes possible to perform control for tracking the feature points in an image region of a specific subject over a plurality of images with higher accuracy.

Other Embodiments

The present invention can be realized through a process in which a program that realizes one or more of the functions of the above embodiments is provided to a system or an apparatus via a network or storage medium, and one or more processors in a computer of the system or apparatus read and execute the program. Further, the present invention can also be realized by a circuit (for example, an ASIC) that realizes one or more functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-90542 filed May 9, 2018, which is hereby incorporated by reference herein in its entirety.

What is claimed is:

1. An image processing apparatus comprising:
a memory storing instructions; and
a processor executing the instructions causing the image processing apparatus to:
acquire an image,
extract feature points of the image,
track the feature points,
estimate a target of interest in the image,
calculate a matching degree indicating a degree of matching between the estimated target of interest and the tracked feature points, and
select a feature point to which tracking is continued from the feature points according to the matching degree.

2. The image processing apparatus according to claim 1, wherein the processor estimates the target of interest using one or more of photographing mode information, main subject information, a shutter speed, a focal length and depth information of an image pickup optical system, inertial sensor information, and user instruction information.

3. The image processing apparatus according to claim 1, wherein the processor estimates the target of interest using either one or both of a first degree indicating a level of possibility of the target of interest being a background, and a second degree indicating a level of possibility of the target of interest being a subject.

4. The image processing apparatus according to claim 1, wherein the processor calculates the matching degree using one or more of the number of feature points positioned in a background region or a subject region of the image, a variation in a distribution of the feature points, and a deviation of the distribution of the feature points.

5. The image processing apparatus according to claim 1, wherein the processor selects the feature points so that a proportion or the number of the feature points for which tracking continues when the matching degree is a first value becomes larger than the proportion or the number of the feature points for which tracking continues when the matching degree is a second value smaller than the first value.

6. The image processing apparatus according to claim 1, wherein the processor selects feature points for which tracking continues, using one or more of the matching degree, reliability of tracking, a distance from a centroid of a region corresponding to the target of interest to the feature point, and a statistical value of a motion vector of the feature point, as indexes.

7. The image processing apparatus according to claim 6, wherein the processor selects a feature point for which tracking continues on the basis of a result of a weighting addition calculation in which the number of selections and a weight determined for each index are used.

8. The image processing apparatus according to claim 6, wherein the processor selects a feature point for which tracking continues on the basis of a predetermined priority of the index.

9. The image processing apparatus according to claim 6, wherein the processor selects the feature point of which the matching degree or the reliability of the tracking is higher, as a feature point for which tracking continues.

10. The image processing apparatus according to claim 6, wherein the processor determines the tracking feature point in order from a feature point of which a distance from a centroid of a background region of the image is great.

11. The image processing apparatus according to claim 6, wherein the processor determines the tracking feature point in order from a feature point of which a distance from a centroid of a subject region of the image is small.

12. The image processing apparatus according to claim 6, wherein the processor generates a histogram using a statistic value of a motion vector indicating a motion of the feature point and selects the feature point for which tracking continues on the basis of a frequency of the motion vector.

13. The image processing apparatus according to claim 1, wherein the processor compensates for new feature points corresponding to the number of feature points for which it is determined that tracking will not continue, as feature points to be tracked.

14. The image processing apparatus according to claim 6, wherein the processor compensates for a feature point having a higher matching degree as the feature point to be tracked.

15. The image processing apparatus according to claim 3, wherein the processor calculates the matching degree using the first degree and a proportion of the feature points positioned in a background region of the image.

16. The image processing apparatus according to claim 3, wherein the processor calculates the matching degree using the second degree and a proportion of feature points positioned in a subject region of the image.

17. The image processing apparatus according to claim 1, wherein the processor
estimates a target of interest in an image including an image region of a specific subject, and
tracks the feature point in the image region of the specific subject over a plurality of images to be acquired.

18. An image processing apparatus comprising:
a memory storing instructions; and
a processor executing the instructions causing the image processing apparatus to:
acquire an image,
extract feature points of the image,
track the feature points in an image region of a specific subject over a plurality of images to be acquired,
estimate a target of interest in an image including the image region of the specific subject,
calculate a matching degree indicating a matching degree between the estimated target of interest and the tracked feature points, and
select feature points to which tracking is continued from the feature points according to the matching degree.

19. An image pickup apparatus comprising:
an image pickup unit;
a memory storing instructions; and
a processor executing the instructions causing the image processing apparatus to:
acquire an image from the image pickup unit,
extract feature points of the image,
track the feature points,
estimate a target of interest in the image,
calculate a matching degree indicating a degree of matching between the estimated target of interest and the tracked feature points, and
select a feature point to which tracking is continued from the feature points according to the matching degree.

20. A method for an image processing apparatus to execute tracking of feature points, the method comprising:
extracting feature points of the image;
estimating a target of interest in the image;
calculating a matching degree indicating a degree of matching between the estimated target of interest and tracking feature points that are tracking targets; and
selecting a feature point to which tracking is continued from the feature points according to the matching degree.

21. A method for an image processing apparatus to execute tracking of feature points for a plurality of images, the method comprising:
extracting feature points of the plurality of images;
estimating a target of interest in an image including an image region of a specific subject;
calculating a matching degree indicating a degree of matching between the estimated target of interest and tracking feature points that are tracking targets;
determining a feature point that is a tracking target according to the matching degree and controlling the tracking feature point; and
tracking the feature point determined as the tracking target.

22. A non-transitory storage medium on which a computer program for making a computer to execute a method in an image processing apparatus, the method comprising:
extracting feature points of the image;
estimating a target of interest in the image;

calculating a matching degree indicating a degree of matching between the estimated target of interest and tracking feature points that are tracking targets; and selecting a feature point for which tracking will continue from the feature points according to the matching degree.

23. A non-transitory storage medium on which a computer program for making a computer to execute a method in an image processing apparatus, the method comprising:

extracting feature points of the plurality of images;

estimating a target of interest in an image including an image region of a specific subject;

calculating a matching degree indicating a degree of matching between the estimated target of interest and feature points that are tracking targets;

determining a feature point that is a tracking target according to the matching degree and controlling the tracking feature point; and tracking the feature point determined as the tracking target.

* * * * *